(12) United States Patent
Solihin

(10) Patent No.: US 10,007,605 B2
(45) Date of Patent: *Jun. 26, 2018

(54) HARDWARE-BASED ARRAY COMPRESSION

(71) Applicant: EMPIRE TECHNOLOGY DEVELOPMENT LLC, Wilmington, DE (US)

(72) Inventor: Yan Solihin, Apex, NC (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/859,322

(22) Filed: Sep. 20, 2015

(65) Prior Publication Data

US 2016/0117257 A1    Apr. 28, 2016

Related U.S. Application Data

(63) Continuation of application No. 13/497,442, filed as application No. PCT/US2011/049712 on Aug. 30, 2011, now Pat. No. 9,304,898.

(51) Int. Cl.
*G06F 12/06* (2006.01)
*G06F 12/02* (2006.01)
(Continued)

(52) U.S. Cl.
CPC ...... *G06F 12/0646* (2013.01); *G06F 12/0223* (2013.01); *G06F 12/1009* (2013.01);
(Continued)

(58) Field of Classification Search
None
See application file for complete search history.

(56) References Cited

U.S. PATENT DOCUMENTS 4,742,451 A    5/1988  Bruckert et al.
5,218,670 A    6/1993  Sodek, Jr. et al.
(Continued)

OTHER PUBLICATIONS

Chai, L., et al., "Understanding the Impact of Multi-Core Architecture in Cluster Computing: A Case Study with Intel Dual-Core System," Proceedings of the Seventh IEEE International Symposium on Cluster Computing and the Grid, pp. 471-478 (May 14-17, 2007).

(Continued)

*Primary Examiner* — Jau Shya Meng

(57) ABSTRACT

A computing system to compress an array using hardware-based compression and to perform various instructions on the compressed array is generally described. The computing system may receive an instruction adapted to access an address in an array. The computing system may determine whether the address is compressible. If the address is compressible, then the computing system may determine a compressed address of a compressed array based on the address. The compressed array may represent a compressed layout of the array, where a reduced size of each compressed element in the compressed array is smaller than an original size of each element in the array. The computing system may access the compressed array at the compressed address in accordance with the instruction.

17 Claims, 7 Drawing Sheets

(51) Int. Cl.
*G06F 12/1009* (2016.01)
*G06F 12/109* (2016.01)
*G06F 17/30* (2006.01)

(52) U.S. Cl.
CPC ...... *G06F 12/109* (2013.01); *G06F 17/30218* (2013.01); *G06F 2212/401* (2013.01); *G06F 2212/656* (2013.01); *G06F 2212/657* (2013.01); *Y02D 10/13* (2018.01)

(56) References Cited

U.S. PATENT DOCUMENTS

| | | | |
|---|---|---|---|
| 5,574,952 A | | 11/1996 | Brady et al. |
| 5,696,927 A | * | 12/1997 | MacDonald .......... G06F 12/023 710/68 |
| 6,005,503 A | * | 12/1999 | Burrows ............. H03M 7/3084 341/67 |
| 6,134,167 A | * | 10/2000 | Atkinson ............. G11C 11/406 365/222 |
| 6,311,261 B1 | | 10/2001 | Chamdani et al. |
| 6,599,242 B1 | * | 7/2003 | Splett .................... A61B 5/0006 345/440.1 |
| 6,618,728 B1 | | 9/2003 | Rail |
| 7,446,681 B2 | | 11/2008 | Gunther |
| 7,805,413 B2 | | 9/2010 | Hosoi |
| 8,423,520 B2 | * | 4/2013 | Rao .................... G06F 17/3015 707/692 |
| 8,769,231 B1 | | 7/2014 | Ansari et al. |
| 2001/0046260 A1 | | 11/2001 | Molloy |
| 2001/0055124 A1 | | 12/2001 | Varga |
| 2003/0163662 A1 | | 8/2003 | Glew et al. |
| 2006/0004997 A1 | | 1/2006 | Mykland |
| 2006/0106940 A1 | * | 5/2006 | Jagannathan .......... H04L 69/16 709/238 |
| 2006/0294192 A1 | * | 12/2006 | Mao ...................... H04L 63/102 709/213 |
| 2010/0223237 A1 | | 9/2010 | Mishra et al. |
| 2011/0078389 A1 | * | 3/2011 | Patel ........................ G06F 9/32 711/154 |
| 2011/0289112 A1 | * | 11/2011 | Kamimura .......... G06F 17/3033 707/769 |

OTHER PUBLICATIONS

International Search Report and Written Opinion for International Application No. PCT/US11/49712 dated Jan. 18, 2012.
Kourtis, K., et al., "Optimizing sparse matrix-vector multiplication using index and value compression," Proceedings of the 5th conference on Computing frontiers, pp. 87-96 (May 5-7, 2008).
Liu, L., and Li, Z., "A Compiler-automated Array Compression Scheme for Optimizing Memory Intensive Programs," Proceedings of the 24th ACM International Conference on Supercomputing, pp. 285-294 (2010).
Liu, L., et al., "Analyzing memory access intensity in parallel programs on multicore," Proceedings of the 22nd annual international conference on Supercomputing, pp. 359-367 (Jun. 7-12, 2008).
Willcock, J., and Lumsdaine, A., "Accelerating sparse matrix computations via data compression," Proceedings of the 20th annual international conference on Supercomputing, pp. 307-316 (2006).
Williams, S., et al., "Optimization of sparse matrix-vector multiplication on emerging multicore platforms," Proceedings of the 2007 ACM/IEEE conference on Supercomputing, pp. 1-12 (Nov. 10-16, 2007).

* cited by examiner

HARDWARE-BASED ARRAY COMPRESSION

CROSS-REFERENCE TO RELATED APPLICATIONS

This Application is a continuation application under 35 U.S.C. § 120 of U.S. patent application Ser. No. 13/497,442, filed on Mar. 21, 2012, now U.S. Pat. No. 9,304,898, which is the U.S. National Stage filing under 35 U.S.C. § 371 of International Application No. PCT/US2011/049712, filed on Aug. 30, 2011. The disclosures of U.S. patent application Ser. No. 13/497,442 and International Application No. PCT/US2011/049712 are hereby incorporated by reference in their entireties.

BACKGROUND

Unless otherwise indicated herein, the materials described in this section are not prior art to the claims in this application and are not admitted to be prior art by inclusion in this section.

Some ubiquitous computing ("ubicomp") devices utilize batteries as an energy source. As ubicomp devices become more pervasive, the demand for computational power in the ubicomp devices may increase, thereby also increasing energy consumption by the ubicomp devices. The corresponding energy consumption by ubicomp device resulting from the increased demand for computational power is projected by some to outpace the growth of energy capacity in batteries. As a result, efficient energy utilization may become increasingly important for ubicomp devices and other devices that have increasing energy demands but operate under energy constraints.

A source of energy inefficiency in modern computing devices may result from the allocation of wide data storage in computer programs where only a portion of the allocated data storage is utilized to store data items. For example, when a programmer creates an array within a program, the programmer may declare each element within the array as a "long" (i.e., a 32 bit integer) or a "long long" (i.e., a 64 bit integer) data type. In some cases, the programmer may be aware that, when the program is run, values of the elements will likely be smaller integers utilizing less than the allocated 32 or 64 bits. However, the programmer may create the excess data storage for fear of causing an integer overflow, such as when input of the program changes and/or when the program code is reused for other applications. The excess data storage that is allocated but not utilized by a processor may take up valuable space in memory and/or incur significant energy overhead.

SUMMARY

The present disclosure generally describes techniques for compressing an array. Some example methods may include receiving an instruction adapted to access an address in the array. Example methods may also include determining whether the address is compressible. Example methods may also include determining a compressed address of a compressed array based on the address. The compressed array may represent a compressed layout of the array where a reduced size of each compressed element in the compressed array is smaller than an original size of each element in the array. Example methods may further include accessing the compressed array at the compressed address in accordance with the instruction.

The present disclosure generally also describes some systems for compressing an array. Some example systems may include an instruction fetch module, an instruction decode module, an address check module, a recompute module, and a memory unit. The instruction fetch module may be adapted to fetch an instruction from an instruction sequence, the instruction adapted to access an address in the array. The instruction decode module may be adapted to decode the instruction to determine the address when the instruction fetch module fetches the instruction. The address check module may be adapted to determine whether the address is compressible. The recompute module may be adapted to determine a compressed address of a compressed array based on the address when the address check module determines that the address is compressible. The compressed array may represent a compressed layout of the array where a reduced size of each compressed element in the compressed array is smaller than an original size of each element in the array. The memory unit coupled to a memory of the computer system, the memory unit adapted to access the compressed array at the compressed address in accordance with the instruction.

The present disclosure generally further describes some computer-readable storage media for compressing an array. The computer-readable media may have computer-executable instructions stored thereon which, when executed by a computer, cause the computer to perform one or more operations. Some example computer-executable instructions may cause the computer to receive a load instruction adapted to cause the computer to access an array at a first address. Example computer-executable instructions may cause the computer to determine whether the first address is compressible when the load instruction is received. Example computer-executable instructions may cause the computer to determine a first compressed address of a compressed array based on the first address when the first address is determined to be compressible. The compressed array may represent a compressed layout of the array where a reduced size of each compressed element in the compressed array is smaller than an original size of each element in the array. Example computer-executable instructions may cause the computer to retrieve a first data segment from the compressed array at the first compressed address in accordance with the load instruction. Example computer-executable instructions may cause the computer to form first data by performing a shift operation and an align operation on the first data segment. Example computer-executable instructions may cause the computer to output the first data to a load/store queue.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
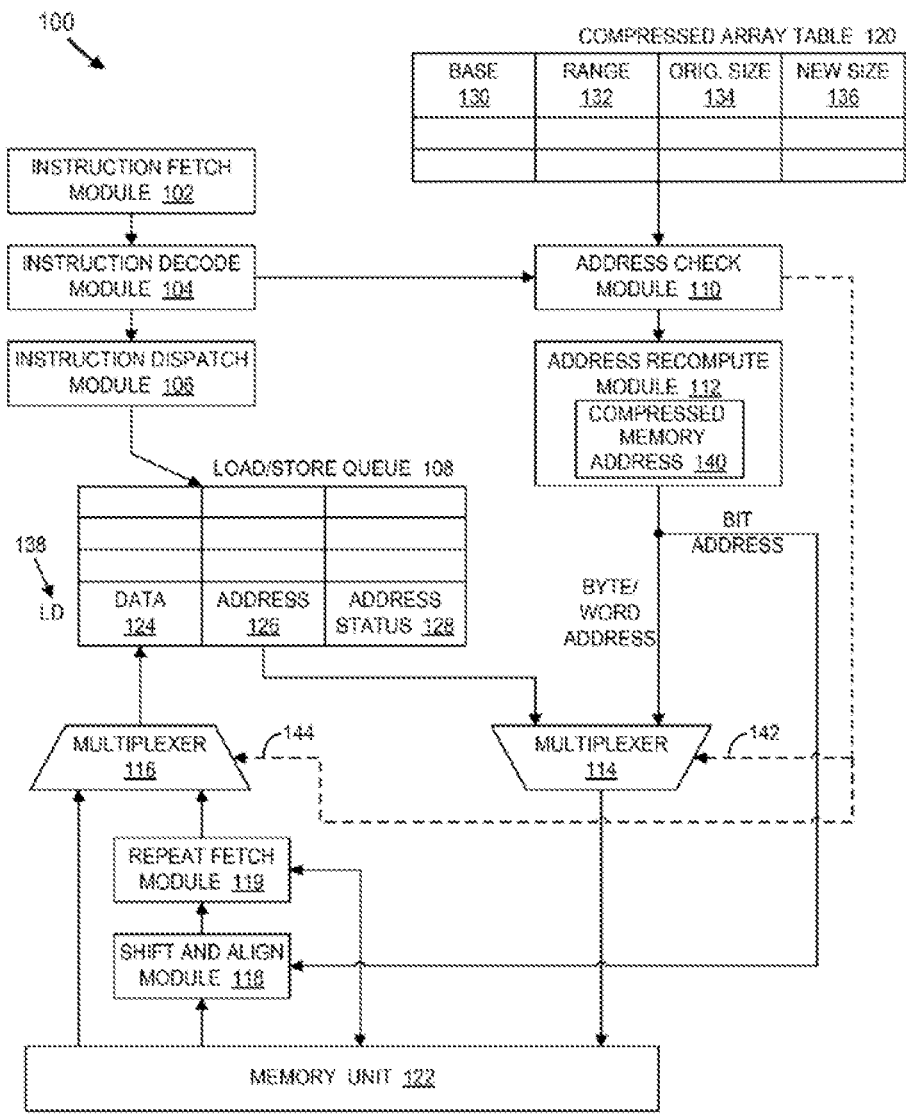
FIG. 1 is a functional block diagram illustrating an example processor pipeline adapted to perform a load instruction on a compressed array.

all arranged according to at least some embodiments presented herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

A number of approaches for improving array access performance have been proposed. A first approach may adapt a compiler or other software to generate two separate arrays (an uncompressed array and a compressed array) for each original array declaration in a program. The compiler may also insert additional program code into the program for each read and write operation to an original array, such that each read and write operation is modified to be performed on the compressed array. The additional program code may also detect integer overflow in the compressed array and utilize the uncompressed array when integer overflow is detected in the compressed array. For example, if no integer overflow is detected during a read operation, then the read operation may be performed on the compressed array; otherwise, the read operation may be performed on the uncompressed array. If no integer overflow is detected during a write operation, then the write operation may be performed on the compressed array otherwise, the write operation may be performed on the uncompressed array, and an error message may be written in the corresponding element on the compressed array.

A second approach may adapt a compiler or other software to compress index array values by utilizing delta encoding. Index arrays refer to arrays that index other arrays. In delta encoding, each index value stored in an element of the array represents an increase or decrease in value (i.e., a delta) compared to a value of a previous element. The compiler may also insert additional program code for each read and write operation to an index array in a program. The additional program code may add arithmetic operations to handle the conversion between original index values and delta values, thereby increasing the complexity of the program.

These and other software techniques adapted to compress arrays may present a number of drawbacks. First, the software techniques may impact performance in a non-uniform manner where some applications have worse performance while other applications have improved performance. This non-uniform performance impact may result from the modification of simple read and write operations into more complex read and write operations by the insertion of additional program code. For example, the first approach may expand the program code to include, for each read and write operation, a comparison, a conditional branch, and/or an additional store operation. The second approach may expand the program code to include, for each read and write operation, additional branches and/or additional arithmetic operations.

Second, the software techniques may lack energy efficiency, thereby making such software techniques poorly suited for implementation in ubicomp devices and other devices operating under limited energy resources. For example, the additional program code may incur a significant increase in the number of instructions that are executed each time the original array is accessed in the program, even in cases where accesses are to the compressed array in the first conventional approach. Thus, even in the cases where the software techniques improve performance over the original program code, the energy savings resulting from shorter execution time may be offset by increased energy consumption resulting from the execution of additional instructions.

Third, the software techniques may have limited applicability. For example, in programming languages that allow pointers, the compiler may not be able to guarantee the correctness of optimizations that create compressed arrays in the first conventional approach. In particular, the compiler may not be able to ensure that no pointers point to the original array, such pointers may directly modify an element in the original array without also modifying the same element in the compressed array. Consequently, the software techniques are unlikely to be employed in production compilers.

This disclosure is generally drawn, inter alia, to hardware technology adapted to handle array compression in an automated manner within a computing system. The hardware technology may also be adapted to perform various instructions, such as load and store instructions, on the compressed arrays. The hardware technology may be configured to store an original array in a compressed form in a first portion of an original address range of the original array. The remaining portion of the original address range that is not occupied by the compressed array may be allocated as an overflow region. When a program references the original array, the hardware technology may be configured to recompute the reference so that a processor reads from and writes to the proper compressed element in the compressed array. In the event that a value to be stored in the compressed array would cause an integer overflow, the hardware technology may be configured to store the value in the overflow region and store an index to the overflow region in the proper compressed element of the compressed array.

The hardware technology may ensure the safety of the array compression because accesses to arrays are performed by the hardware. For example, an access to the same array element by two different pointers may reach the same element in the array. Additionally, the hardware technology may provide energy efficiency because of a reduced memory footprint due to a reduced amount of data. Because the total amount of data processed is reduced, additional benefits may be realized including improved cache performance, improved translation lookaside buffer performance, reduced memory bus traffic, and/or improved spatial locality.

Through the hardware technology, program code does not need to be modified; that is, a reference to an original array in a program may be utilized to access a corresponding compressed array without additional program code because the hardware technology handles the array compression. The memory footprint may further be reduced because no additional instructions need to be executed. Further, the hardware technology may provide uniform performance improvement because the hardware technology does not increase instruction count. In various implementations, the hardware technology does not hurt performance in a worst case, and may significantly improve performance in average and best cases.

FIG. 1 is a functional block diagram illustrating an example processor pipeline 100 adapted to perform a load instruction on a compressed array, arranged in accordance with at least some embodiments presented herein. The processor pipeline 100 may be implemented on a computer having a processor and a memory. In some embodiments, the processor pipeline 100 may be implemented on an ubicomp device or other device operating under limited energy resources.

The processor pipeline 100 may include an instruction fetch module 102, an instruction decode module 104, an instruction dispatch module 106, and a load/store queue 108. The processor pipeline 100 may also include an address check module 110, an address recompute module 112, a first multiplexer 114, a second multiplexer 116, a shift and align module 118, and a repeat fetch module 119. The processor pipeline 100 may further include a compressed array table 120 and a memory unit 122.

The load/store queue 108 may be configured to store information regarding one or more instructions dispatched by the instruction dispatch module 106. Some examples of such information may include the type of instruction (e.g., load, store, etc.), one or more memory addresses associated with the instruction, data associated with the instruction, and/or one or more operands associated with the instruction. For each dispatched instruction, the load/store queue 108 may be configured to store data 124, a memory address 126, and an address status 128.

The compressed array table 120 may be configured to store information regarding one or more compressed arrays in memory. An original array corresponding to multiple memory addresses may be compressed to form a compressed array corresponding to multiple compressed memory addresses. The compressed array may replace the portion of the memory allocated for the original array. Additional details regarding the original array and the compressed array are provided below with reference to FIGS. 3A and 3B.

For each compressed array based on an original array, the compressed array table 120 may be configured to store a base address 130 of the original array, a range 132 of the original array, an original size 134 of an element of the original array, and a new size 136 of an element of the compressed array. The base address 130 may refer to the memory address of the first element in the original array. The range 132 may refer to the total number of memory addresses occupied by the original array. The original size 134 may refer to the size (e.g., in terms of bits) of an element of the original array. The new size 136 may refer to the size (e.g., in terms of bits) of an element of the compressed array.

The instruction fetch module 102 may be configured to fetch an instruction from the memory. For example, the memory may contain multiple instructions in an instruction sequence. When the instruction fetch module 102 fetches the instruction from the memory, the instruction decode module 104 may be configured to interpret the instruction, thereby identifying the type of instruction, identifying any memory addresses associated with the instruction, identifying any data associated with the instruction, and/or identifying any operands associated with the instruction.

In some embodiments, the instruction may be a load instruction, such as load instruction 138. The load instruction 138 may instruct the memory unit 122 to retrieve the data 124 stored a source memory location specified by the memory address 126 and load the data 124 into a processor register. When the instruction decode module 104 interprets the instruction as a load instruction, the instruction dispatch module 106 may be configured to dispatch the load instruction into the load/store queue 108. In the case of the load instruction 138, the instruction dispatch module 106 may be configured to insert the memory address 126 into the load/store queue 108.

The address status 128 may indicate whether the memory address 126 is available in the load/store queue 108. For example, when the instruction dispatch module 106 dispatches the load instruction into the load/store queue 108, the functional unit of the processor may not have yet computed the memory address 126. In this case, the address status 128 may indicate that the memory address 126 is unavailable. When the functional unit of the processor computes the memory address 126, the address status 128 may indicate that the memory address 126 is available. In some embodiments, a binary "0" value of the address status 128 may indicate that the memory address 126 is unavailable, and a binary "1" value of the address status 128 may indicate that the memory address 126 is available.

When the instruction decode module 104 interprets the instruction as a load instruction and identifies the memory address 126, the address check module 110 may be configured to determine whether the memory address 126 is compressible. As used herein, the term "compressible memory address" may refer to a memory address of an original array that has been compressed into a compressed array. The address check module 110 may be configured to determine whether the memory address 126 is compressible by determining whether the memory address 126 falls within a range of compressible memory addresses. The range of compressible memory addresses may refer to the memory address range occupied by the original array. The compressed array may occupy a portion of this memory address range.

In some embodiments, the range of compressible memory addresses may refer to memory addresses greater than or equal to the base address 130 and less than the sum the base address 130 and the range 132 (i.e., base+range) for each of the original arrays represented in the compressed array table 120. If the memory address 126 falls within the range of compressible memory addresses (i.e., base≤address<(base+range)), then the address check module 110 may be configured to determine that the memory address 126 is compressible. If the memory address 126 does not fall within the range of compressible memory addresses, then the address check module 110 may be configured to determine that the memory address 126 is not compressible.

The address recompute module 112 may be configured to compute a compressed memory address 140 corresponding to the memory address 126. In some embodiments, the address recompute module 112 may be configured to compute the compressed memory address 140 via the following formula:

$$newAddr=(newSize/origSize)*(origAddr-Base)+Base$$

where newAddr refers to the compressed memory address 140, newSize refers to the new size 136 of an element in the compressed array, origSize refers to the original size 134 of an element in the original array, origAddr refers to the memory address 126, and Base refers to the base address 130. The address recompute module 112 may be configured to output the compressed memory address 140 to the first multiplexer 114 and the shift and align module 118.

The first multiplexer 114 may be configured to receive as inputs the memory address 126 from the load/store queue 108 and the compressed memory address 140 from the address recompute module 112. The first multiplexer 114 may be configured to also receive a first selector input 142 from the address check module 110. The first selector input 142 may be the result when the address check module 110 determines whether the memory address 126 is compressible. In some embodiments, when the first selector input 142 indicates that the memory address 126 is compressible, the first multiplexer 114 may be configured to output the compressed memory address 140 to the memory unit 122. When the first selector input 142 indicates that the memory address 126 is not compressible, the first multiplexer 114 may be configured to output the memory address 126 to the memory unit 122.

The memory unit 122 may be configured to receive either the memory address 126 or the compressed memory address 140 output from the first multiplexer 114. Upon receiving either the memory address 126 or the compressed memory address 140 from the first multiplexer 114, the memory unit 122 may be configured to retrieve the data 124 from the memory at the memory address 126 or the compressed memory address 140. More specifically, if the memory unit 122 receives the memory address 126, then the memory unit 122 may be configured to retrieve the data 124 from the memory at the memory address 126. The memory unit 122 may receive the memory address 126 from the first multiplexer 114 when the address check module 110 determines that the memory address 126 is not within the range of compressible memory addresses. This may indicate that an original array corresponding to the memory address 126 has not been replaced by a compressed array. Thus, the data 124 can be found in the original array at the memory address 126.

The compressed memory address 140 may include a byte/word address corresponding to the byte, word, double word, or etc. in memory where the data 124 can be found. The byte/word address may be represented in the conventional granularity of the memory. If the memory unit 122 receives the compressed memory address 140, then the memory unit 122 may be configured to retrieve a data candidate from the memory at the byte/word address. The memory unit 122 may receive the compressed memory address 140 from the first multiplexer 114 when the address check module 110 determines that the memory address 126 is within the range of compressible memory addresses. This may indicate that an original array corresponding to the memory address 126 has been replaced by the compressed array. Thus, the data candidate can be found in compressed array at the byte/word address of the compressed memory address 140.

When the memory unit 122 retrieves the data 124 from the memory, the memory unit 122 may be configured to output the data 124 directly to the second multiplexer 116. When the memory unit 122 retrieves the data candidate from the memory, the memory unit 122 may be configured to output the data candidate to the shift and align module 118. When the processor retrieves the data candidate from the compressed array, the data candidate may be misaligned, contain unneeded bits, and/or require padding bits. In this regard, the shift and align module 118 may be configured to perform a shift operation to remove the unneeded bits from the data candidate and/or add the padding bits to the data candidate and perform an align operation to recover an original alignment of the data candidate before it was stored in the compressed array. The shift and align module 118 may also be configured to receive the compressed memory address 140 from the address recompute module 112. The compressed memory address 140 may include a bit address of the data candidate. The bit address may indicate which bits in the data candidate contain the requested data). The shift and align module 118 may be configured to perform the shift and align operation based on the bit address. Upon performing the shift and align operation on the data candidate, the shift and align module 118 may be configured to output the data candidate to the repeat fetch module 119.

As described in greater detail below with reference to FIGS. 3A and 3B, the compressed array may include a compressed region and an overflow region. The compressed region may include multiple compressed elements, each of which is associated with a status bit. The overflow region may include multiple overflow elements. The compressed element at the compressed memory address 140 may contain the data 124 or an index to the overflow region depending on the value of the corresponding status bit. If the corresponding status bit indicates that the compressed element contains the index, then the overflow element at the index may contain the data 124.

The repeat fetch module 119 may be configured to check the status bit at the compressed memory address 140. If the status bit indicates that the compressed element at the compressed memory address 140 contains the data 124, then the data candidate retrieved by the memory unit 122 is the data 124. In this case, the repeat fetch module 119 may be configured to provide the data candidate (i.e., the data 124) to the second multiplexer 116. If the status bit indicates that the compressed element at the compressed memory address 140 contains an index to the overflow region, then the repeat fetch module 119 may be configured to instruct the memory unit 122 to retrieve the data 124 from the overflow region at the index. When memory unit 122 retrieves the data 124 and the repeat fetch module 119 receives the data 124 from the memory unit 122, the repeat fetch module 119 may be configured to provide the data 124 to the second multiplexer 116.

The second multiplexer 116 may be configured to receive as a first input the data 124 directly from the memory unit 122 and as a second input the data 124 from the repeat fetch module 119. The second multiplexer 116 may be configured to also receive a second selector input 144 from the address check module 110. The second selector input 144 may be the result when the address check module 110 determines whether the memory address 126 is compressible. In some embodiments, when the second selector input 144 indicates that the memory address 126 is compressible, then the second multiplexer 116 may be configured to output the data 124 from the second input to the load/store queue 108. When the second selector input 144 indicates that the memory address 126 is not compressible, then the second multiplexer 116 may be configured to output the data 124 from the first input to the load/store queue 108. The load/store queue 108 may be configured to return the data 124 to the processor.

Figure 2:
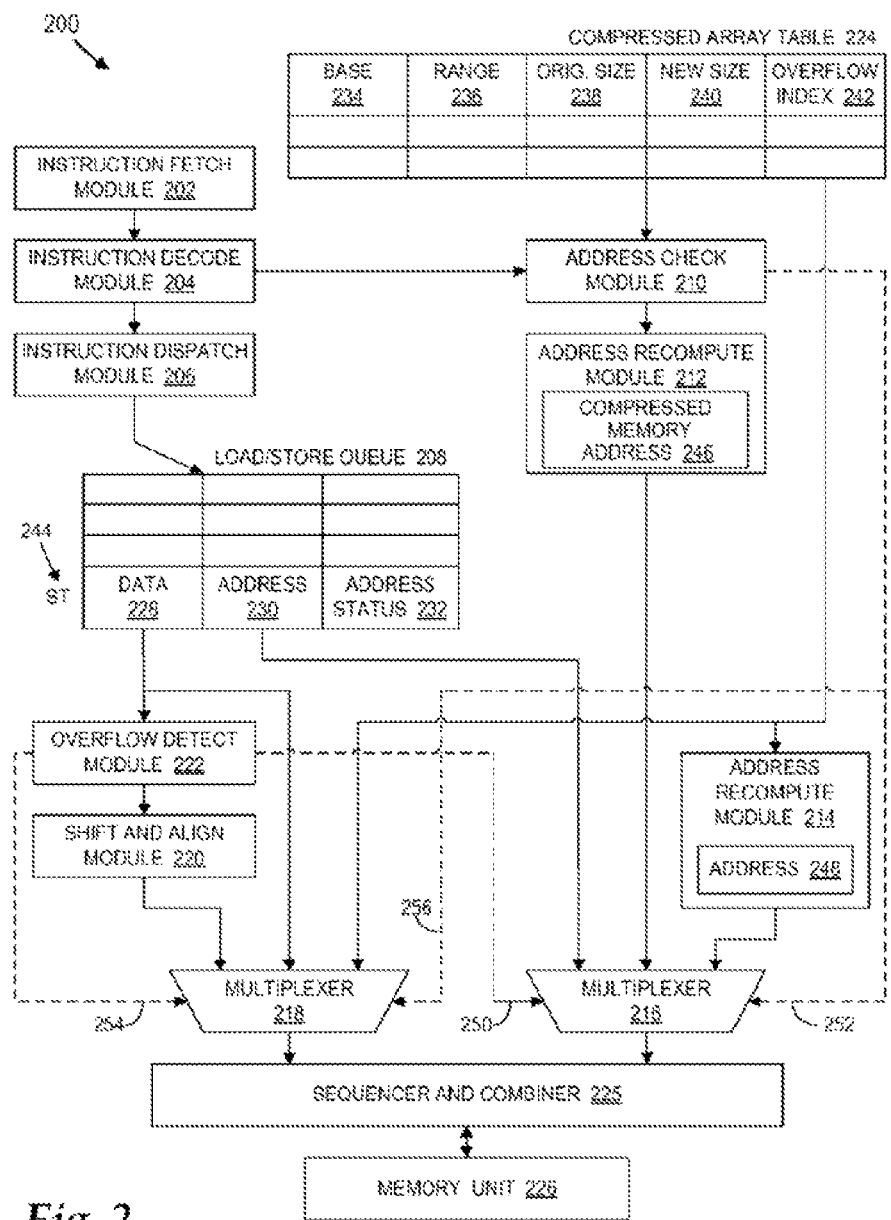
FIG. 2 is a functional block diagram illustrating an example processor pipeline adapted to perform a store instruction on a compressed array.

FIG. 2 is a functional block diagram illustrating an example processor pipeline 200 adapted to perform a store instruction on a compressed array, arranged in accordance with at least some embodiments presented herein. The processor pipeline 200 may be implemented on a computer having a processor and a memory. In some embodiments, the processor pipeline 200 may be implemented on an ubicomp device or other device operating under limited energy resources. The processor pipeline 200 may operate independently of the processor pipeline 100, according to some implementations. The processor pipeline 200 may be integrated with the processor pipeline 100 in order to handle both load and store instructions with respect to the compressed array, according to some other implementations.

The processor pipeline 200 may include an instruction fetch module 202, an instruction decode module 204, an instruction dispatch module 206, and a load/store queue 208. The processor pipeline 200 may also include an address check module 210, an first address recompute module 212, a second address recompute module 214, a first multiplexer 216, a second multiplexer 218, a shift and align module 220, and an overflow detect module 222. The processor pipeline 200 may further include a compressed array table 224, a sequencer and combiner 225, and a memory unit 226.

The load/store queue 208 may be configured to store information regarding one or more instructions dispatched by the instruction dispatch module 206. Some examples of such information may include the type of instruction (e.g., load, store), one or more memory addresses associated with the instruction, data associated with the instruction, and/or one or more operands associated with the instruction. For each dispatched instruction, the load/store queue 208 may be configured to store data 228, a memory address 230, and an address status 232.

The compressed array table 224 may be configured to store information regarding one or more compressed arrays in memory. An original array corresponding to multiple memory addresses may be compressed to form a compressed array corresponding to multiple compressed memory addresses. The compressed array may replace the portion of the memory allocated for the original array. For each compressed array based on an original array, the compressed array table 224 may be configured to store a base address 234 of the original array, a range 236 of the original array, an original size 238 of an element in the original array, a new size 240 of an element in the compressed array, and an overflow index 242 of compressed array. The base address 234 may refer to the memory address of the first element in the original array. The range 236 may refer to the total number of memory addresses occupied by the original array. The original size 238 may refer to the size (e.g., in terms of bits) of an element of the original array. The new size 240 may refer to the size (e.g., in terms of bits) of an element of the compressed array.

The overflow index 242 may refer to the next free element in an overflow region of the compressed array. As described in greater detail below with reference to FIGS. 3A and 3B, the compressed array may include a compressed region and an overflow region. The compressed region may include multiple compressed elements having a reduced size smaller than the size of the elements in the original array. The overflow region may include multiple overflow elements, each having a regular size equivalent to the size of the elements in the original array. In some cases, a data item to be stored in a compressed element of the compressed region is too large for the compressed element. In these cases, the data item may be stored in an overflow element of the overflow region. When a data item is stored in the next free overflow element corresponding to the overflow index 242, the overflow index 242 may be incremented.

The instruction fetch module 202 may be configured to fetch an instruction from the memory. For example, the memory may contain multiple instructions in an instruction sequence. When the instruction fetch module 202 fetches the instruction from the memory, the instruction decode module 204 may be configured to interpret the instruction, thereby identifying the type of instruction, identifying any memory addresses associated with the instruction, identifying any data associated with the instruction, and/or identifying any operands associated with the instruction.

In some embodiments, the instruction may be a store instruction, such as store instruction 244. The store instruction 244 may instruct the memory unit 226 to store the data 228 into a destination memory location specified by the memory address 230. When the instruction decode module 204 interprets the instruction as a store instruction, the instruction dispatch module 206 may be configured to dispatch the store instruction into the load/store queue 208. In the case of the store instruction 244, the instruction dispatch module 206 may be configured to insert the data 228 and the memory address 230 into the load/store queue 208.

The address status 232 may indicate whether the memory address 230 is available in the load/store queue 208. For example, when the instruction dispatch module 206 dispatches the store instruction into the load/store queue 208, the functional unit of the processor may not have yet computed the memory address 230. In this case, the address status 232 may indicate that the memory address 230 is unavailable. When the functional unit of the processor computes the memory address 230, the address status 232 may indicate that the memory address 230 is available. In some embodiments, a binary "0" value of the address status 232 may indicate that the memory address 230 is unavailable, and a binary "1" value of the address status 232 may indicate that the memory address 230 is available.

When the instruction decode module 204 interprets the instruction as a store instruction and identifies the memory address 230, the address check module 210 may be configured to determine whether the memory address 230 is compressible. As previously described, the term "compressible memory address" may refer to a memory address of an original array that has been compressed into a compressed array. The address check module 210 may be configured to determine whether the memory address 230 is compressible by determining whether the memory address 230 falls within a range of compressible memory addresses. The range of compressible memory addresses may refer to the memory address range occupied by the original array. The compressed array may occupy a portion of this memory address range.

In some embodiments, the range of compressible memory addresses may refer to memory addresses greater than or equal to the base address 234 and less than the sum the base address 234 and the range 236 (i.e., base+range) for each of the original arrays represented in the compressed array table 224. If the memory address 230 falls within the range of compressible memory addresses (i.e., base≤address<(base+range)), then the address check module 210 may be configured to determine that the memory address 230 is compressible. If the memory address 230 does not fall within the range of compressible memory addresses, then the address check module 210 may be configured to determine that the memory address 230 is not compressible.

The first address recompute module 212 may be configured to compute a compressed memory address 246 corresponding to the memory address 230. In some embodiments, the first address recompute module 212 may be configured to compute the compressed memory address 246 via the following formula:

newAddr=(newSize/origSize)*(origAddr−Base)+Base where newAddr refers to the compressed memory address 246, newSize refers to the new size 240 of an element of the compressed array, origSize refers to the original size 238 of an element of the original array, origAddr refers to the memory address 230, and Base refers to the base address 234. The first address recompute module 212 may be configured to output the compressed memory address 246 to the first multiplexer 216.

The second address recompute module 214 may be configured to receive the overflow index 242 and compute an overflow memory address 248 corresponding to the overflow index 242. As previously described, the overflow index 242 may refer to the next free element in an overflow region of the compressed array. The overflow memory address 248 may be the memory address of the next free element in the overflow region of the compressed array. In some embodiments, the second address recompute module 214 may be configured to compute the overflow memory address 248 via the following formula:

overflowAddr=Base+(newSize/origSize)*range+
overflowIdx*origSize where overflowAddr refers to the overflow memory address 248, Base refers to the base address 234, newSize refers to the new size 240 of an element of the compressed array, origSize refers to the original size 238 of an element of the original array, range refers to the range 236, and overflowIdx refers to the overflow index 242. The second address recompute module 214 may be configured to output the overflow memory address 248 to the first multiplexer 216. The value of Base+(newSize/origSize)*range may be rounded up to the nearest aligned address (e.g., byte/word/double-word address), so that overflowAddr will be an automatically aligned address.

The overflow detect module 222 may be configured to receive the data 228 from the load/store queue 208. The overflow detect module 222 may then be configured to determine whether the size of the data 228 is within the size of each compressed element in the compressed region of the compressed array. If the size of the data 228 is within the size of each compressed element in the compressed region of the compressed array, then the data 228 can be stored in a compressed element in the compressed region of the compressed array. If the size of the data 228 is larger than the size of each compressed element in the compressed region of the compressed array, then the data 228 cannot be stored in a compressed element in the compressed region of the compressed array. Instead, the data 228 can be stored in an overflow element in the overflow region of the compressed array. The overflow detect module 222 may be configured to pass the data 228 to the shift and align module 220.

The shift and align module 220 may be configured to receive the data 228. The shift and align module 220 may be configured to shift and align the data 228 in order to fit the compressed format suitable for storage in a compressed element of the compressed array. Upon performing the shift and align operation on the data 228, the shift and align module 220 may be configured to output the data 228 to the second multiplexer 218.

The first multiplexer 216 may be configured to receive as inputs the compressed memory address 246 from the first address recompute module 212 and the overflow memory address 248 from the second address recompute module 214. The first multiplexer 216 may also be configured to receive as another input the memory address 230 from the load/store queue 208. The first multiplexer 216 may be configured to receive a first selector input 250 from the overflow detect module 222. The first selector input 250 may be the result when the overflow detect module 222 determines whether the size of the data 228 is within the size of each compressed element in the compressed region of the compressed array. The first multiplexer 216 may also be configured to receive a second selector input 252 from the address check module 210. The second selector input 252 may be the result when the address check module 210 determines whether the memory address 230 is compressible.

The first multiplexer 216 may be configured to select one or more of its three inputs (i.e., the memory address 230, the compressed memory address 246, and the overflow memory address 248) and output the selected input to the sequencer and combiner 225. The first multiplexer 216 may be configured to make the selection based on the first selector input 250 and the second selector input 252. In some embodiments, when the first selector input 250 indicates that the data 228 is larger than the size of each compressed element in the compressed region of the compressed array, the first multiplexer 216 may be configured to output the compressed memory address 246 and the overflow memory address 248 to the sequencer and combiner 225. When the first selector input 250 indicates that the data 228 is within the size of each compressed element in the compressed region of the compressed array and the second selector input 252 indicates that the memory address 230 is compressible, the first multiplexer 216 may be configured to output the compressed memory address 246 to the sequencer and combiner 225. When the first selector input 250 indicates that the data 228 is within the size of each compressed element in the compressed region of the compressed array and the second selector input 252 indicates that the memory address 230 is not compressible, the first multiplexer 216 may be configured to output the memory address 230 to the sequencer and combiner 225.

The second multiplexer 218 may be configured to receive as inputs the data 228 in a first format (without shifting and alignment) directly from the load/store queue 208 and the data 228 in a second format (with shifting and alignment) from the shift and align module 220. The second multiplexer 218 may also be configured to receive as another input the overflow index 242 from the compressed array table 224. The second multiplexer 218 may be configured to receive a first selector input 254 from the overflow detect module 222. The first selector input 254 may be the result when the overflow detect module 222 determines whether the size of the data 228 is within the size of each compressed element in the compressed region of the compressed array. The second multiplexer 218 may be configured to receive a second selector input 256 from the address check module 210. The second selector input 256 may be the result when the address check module 210 determines whether the memory address 230 is compressible.

The second multiplexer 218 may be configured to select one or more of its three inputs (i.e., the data 228 in the first format, the data 228 in the second format, and the overflow index 242) and output the selected input to the sequencer and combiner 225. The second multiplexer 218 may be configured to make the selection based on the first selector input 254 and the second selector input 256. In some embodiments, when the first selector input 254 indicates that the data 228 is larger than the size of each compressed element in the compressed region of the compressed array, the second multiplexer 218 may be configured to output the data 228 in the first format and the overflow index 242 to the sequencer and combiner 225. When the first selector input 254 indicates that the data 228 is within the size of each compressed element in the compressed region of the compressed array and the second selector input 256 indicates that the memory address 230 is compressible, the second multiplexer 218 may be configured to output the data 228 in the second format to the sequencer and combiner 225. When the first selector input 254 indicates that the data 228 is within the size of each compressed element in the compressed region of the compressed array and the second selector input 256 indicates that the memory address 230 is not compressible, the second multiplexer 218 may be configured to output the data 228 in the first format to the sequencer and combiner 225.

When the overflow detect module 222 determines that the data 228 is within the size of each compressed element in the compressed region of the compressed array and the address check module 210 determines that the address is compressible, the sequencer and combiner 225 may be configured to receive, from the second multiplexer 218, the data 228 in the second format and receive, from the first multiplexer 216, the compressed memory address 246. The sequencer and combiner 225 may be configured to read the data from memory that will be overwritten (i.e., the word/byte in the compressed element corresponding to the compressed memory address 246. The sequencer and combiner 225 may then be configured to combine the data 228 in the second format with the data from memory. For example, the data from memory may be "1 0 1 1 0 0 1 0". The data 228 may be "- - - 0 1 1 1 -". In this example, the fourth through seventh bits in the data from memory may be replaced with the data 228 during the combine process, thereby resulting in the data 228 being "1 0 1 0 1 1 0". That is, the first through third bits and the eighth bit remain the same. When the combine process is complete, the sequencer and combiner 225 may be configured to store, via the memory unit 226, the data 228 in the compressed memory address 246 of the compressed region of the compressed array.

When the overflow detect module 222 determines that the data 228 is larger than the size of each compressed element in the compressed region of the compressed array, the sequencer and combiner 225 may be configured to receive, from the second multiplexer 218, the data 228 in the first format and the overflow index 242 and receive, from the first multiplexer 216, the compressed memory address 246 and the overflow memory address 248. The sequencer and combiner 225 may be configured to read the data from memory that will be overwritten (i.e., the word/byte in the compressed element corresponding to the compressed memory address 246. The sequencer and combiner 225 may then be configured to combine the overflow index 242 with the data from memory, thereby resulting in a combined data containing the overflow index 242. When the combine process is complete, the sequencer and combiner 225 may then be configured to store, via the memory unit 226, the combined data containing the overflow index 242 in the compressed memory address 246 of the compressed region of the compressed array. The sequencer and combiner 225 may also be configured to store, via, the memory unit 226, the data 228 in the first format in the overflow memory address 248 of the overflow region of the compressed array.

When the overflow detect module 222 determines that the data 228 is within the size of each compressed element in the compressed region of the compressed array and the address check module 210 determines that the address is not compressible, the sequencer and combiner 225 may be configured to receive, from the second multiplexer 218, the data 228 in the first format and receive, from the first multiplexer 216, the memory address 230. The sequencer and combiner 225 may be configured to store, via the memory unit 226, the data 228 in the first format in the memory address 230 of the original array.

Figures 3A, 3B:
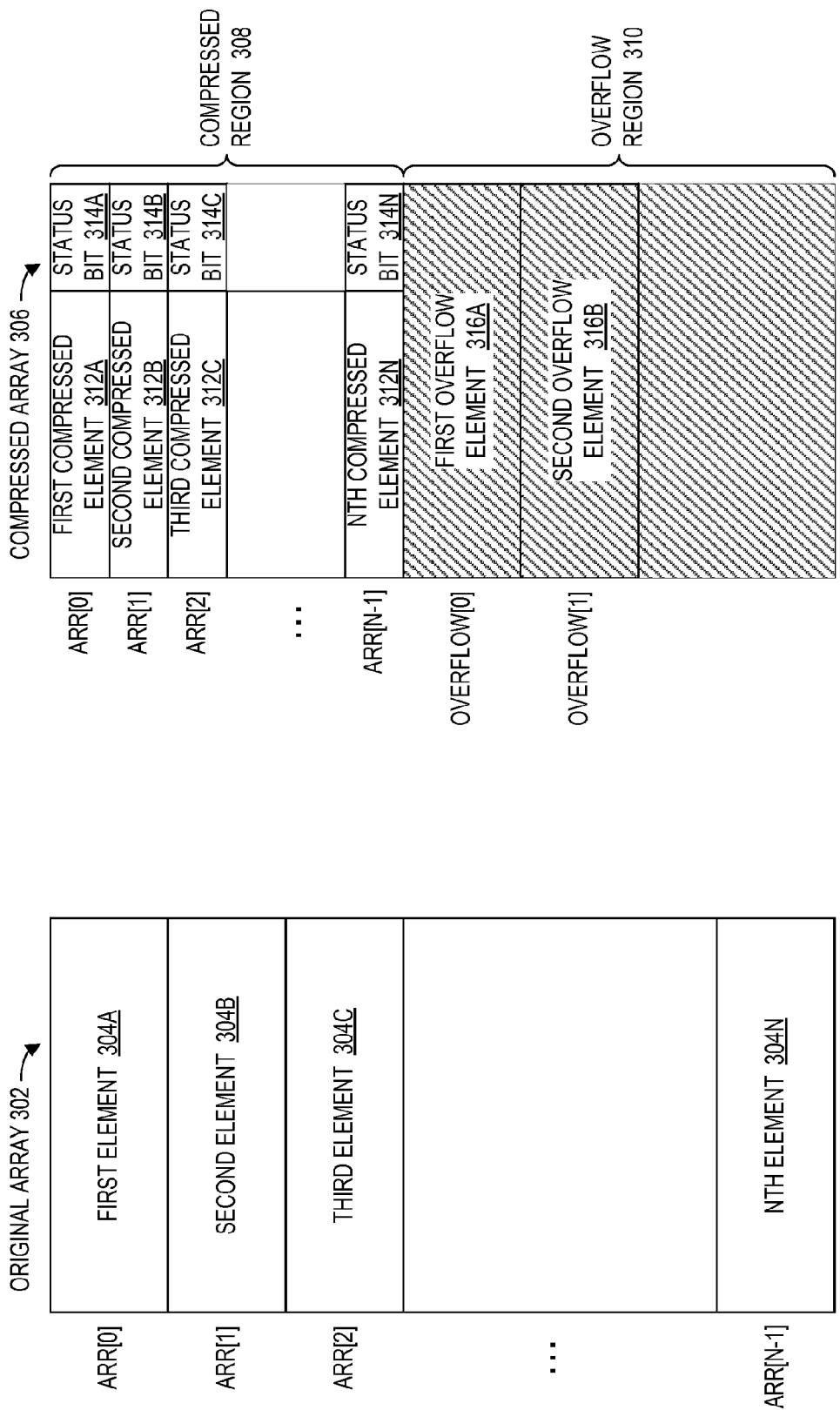
FIG. 3A is a block diagram illustrating an example implementation of an original array.
FIG. 3B is a block diagram illustrating an example implementation of a compressed array.

FIG. 3A is a block diagram illustrating an example implementation of an original array 302, arranged in accordance with at least some embodiments presented herein. The original array 302 may be adapted to store N elements, including a first element 304A, a second element 304B, a third element 304C, and an Nth element 304N. The elements 304A-304N may be collectively referred to as elements 304. A program may access the original array 302 via the following code: arr[index]. For example, arr[0] may access the first element 304A, and arr[N−1] may access the Nth element 304N. The size of each of the elements 304 may be referred to as a regular size. The elements 304 of the original array 302 may occupy a particular address range of the memory. This address range may be referred to herein as an original address range.

FIG. 3B is a block diagram illustrating an example implementation of a compressed array 306, arranged in accordance with at least some embodiments presented herein. According to various embodiments, the compressed array 306 may represent a compressed version of the original array 302. The compressed array 306 may occupy the original address range of the original array 302, thereby replacing the original array 302. The compressed array 306 may include a compressed region 308 and an overflow region 310. The compressed region 308 may include N compressed elements, including a first compressed element 312A, a second compressed element 312B, a third compressed element 312C, and an Nth compressed element 312N. The compressed elements 312A-312N may be collectively referred to as compressed elements 312. The compressed elements 312 may replace the elements 304. The size of each of the compressed elements 312 may be referred to as a reduced size. The reduced size may be smaller than the regular size.

The compressed region 308 may further include N status bits, including a first status bit 314A, a second status bit 314B, a third status bit 314C, and an Nth status bit 314N. The status bits 314A-314N may be collectively referred to as status bits 314. Each of the status bits 314 may augment a corresponding one of the compressed elements 312. For example, the first status bit 314A may augment the first compressed element 312A, and the second status bit 314B may augment the second compressed element 312B. The third status bit 314C may augment the third compressed element 312C, and the Nth status bit 314N may augment the Nth compressed element 312N. The status bits may be interleaved together with the compressed elements 312 as shown in FIG. 3B, or, in some other embodiments, may be arranged in a separate region away from the compressed elements 312.

Because the reduced size may be smaller than the regular size, the compressed region 308 may occupy only a portion of the original address range. The overflow region 310 may be configured to occupy the remaining portion of the original address range. The overflow region 310 may include multiple overflow elements, such as the first overflow element 316A and the second overflow element 316B. The overflow elements 316A-316B may be collectively referred to as overflow elements 316. The size of each of the overflow elements 316 may be the same as the size of each of the elements 304 in the original array 302. That is, each of the overflow elements 316 may be regular size.

A program that contains code intended to access the elements 304 of the original array 302 may also access the compressed elements 312 of the compressed array 306 without modification. For example, if the processor implements the original array 302, then the processor may be configured to interpret the code arr[0] to access the first element 306A in the original array 302. If the processor implements the compressed array 306, then the processor may be configured to interpret the code arr[0] to access the first compressed element 306B in the compressed array 306.

When the processor is instructed to store a data item in one of the compressed elements 312, the processor may be configured to store or attempt to store the data item in the requested compressed element. For example, if the processor is instructed to store a data item in the first compressed element 312A, the processor may be configured to store or attempt to store the data item in the first compressed element 312A. The processor can store the data item in one of the compressed elements 312 when the data item is equal to or smaller than the size of each of the compressed elements 312 (i.e., when the data item is equal to or smaller than the reduced size). In some instances, however, the data item may be larger than the size of each of the compressed elements 312 (i.e., when the data item is larger than the reduced size).

When the processor is instructed to store a data item in one of the compressed elements 312 and the data item is larger than the reduced size, the processor may be configured to store an index of the next free overflow element in the overflow region 310, update the corresponding status bit augmenting the compressed element, and store the data item in the next free overflow element according to the index. For example, if the processor is instructed to store a data item in the first compressed element 312A and the data item is larger than the reduced size, the processor may be configured to retrieve the overflow index 242 from the compressed array table 224 and store the overflow index 242 in the first compressed element 312A. As previously described, the overflow index 242 may indicate the next free overflow element in the overflow elements 316. For example, the overflow index 242 may indicate that the next free overflow element is the first overflow element 316A.

In addition to storing the overflow index 242 in the first compressed element 312A, the processor may be configured to also update the first status bit 314A to indicate that the data item stored in the first compressed element 312A is an index of the next free overflow element in the overflow region 310. In some embodiments, each of the status bits 314 may store either a first bit value or a second bit value. The first bit value stored in a status bit may indicate that the data item stored in the corresponding compressed element is an actual data item (i.e., a data item that is not an index of the next flee overflow element in the overflow region 310). The second bit value stored in a status bit may indicate that the data item stored in the corresponding compressed element is an index of the next free overflow element in the overflow region 310. The status bits 314 may store the first bit value by default according to some implementations. In these implementations, the processor may be configured to update the first status bit 314A by changing the first bit value to the second bit value. When the processor is instructed to retrieve data from the first compressed element 312A, the processor can read the first status bit 314A in order to determine whether the data is contained in the first compressed element 312 or in the overflow region 310.

In addition to storing the overflow index 242 in the first compressed element 312A and updating the first status bit 314A, the processor may be configured to store the data item in the first overflow element 316A according to the overflow index 242. As previously described, the overflow elements 316 are the same size as the elements 304 in the original array 302. Thus, the first overflow element 316A can store the data item when it is too large to be stored in the one of the compressed elements 312. When the processor stores the data item in the first overflow element 316A, the processor may be configured to increment the overflow index 242 such that the overflow index 242 indicates the next free overflow element. For example, if the overflow index 242 is zero, then the processor may be configured to increment the overflow index 242 from zero to one, which corresponds to the second overflow element 316B. Thus, when the processor needs to store another data item in the overflow region 310, the overflow index 242 will indicate that the processor should store the data item in the second overflow element 316B.

It should be appreciated that the number of the overflow elements 316 may be limited by the size of each of the compressed elements 312. That is, the overflow elements 316 may be limited by the reduced size. This is because a compressed element may store an index to an overflow element when the size of a data item is greater than the reduced size and the data item is stored in an overflow element. Thus, in some cases when the number of overflow elements 316 is limited by the size of each of the compressed elements 312, the overflow elements 316 may occupy less than the total address space allocated to the overflow region 310. That is, part of the overflow region 310 may be unusable in such cases.

When the processor generates the compressed array 306 based on the original array 302, the processor may be configured to determine the size of each of the compressed elements 312. That is, the processor may be configured to determine the reduced size. In some embodiments, the processor may be configured to analyze a program in order to determine the reduced size. The processor may be configured to determine the reduced size such that the size of each of the compressed elements 312 is large enough to store at least most of the data items contained in the program, thereby limiting use of the overflow region 310.

The processor may also be configured to receive a declaration or suggestion from a programmer to generate the compressed array 306 having the compressed elements 312 of a particular size. For example, the programmer may declare an array by the following code: long int arr[N]. This code may instruct the processor to generate an array having N elements where each of the N elements is of the type "long integer" (typically four or eight bytes, depending on implementation). The programmer may also declare or suggest compression of the array by the following code: keep_compressed(arr, N, sizeof(long int), sizeof(unsigned char)).

More specifically, keep_compressed may refer to a function in a programming interface where the programmer can declare or suggest compression of an array. The function may accept as inputs the location of the array (i.e., arr), the number of elements in the array (i.e., N), the size of each element in the array (i.e., sizeof(long int)), and the declared or suggested size of the compressed element (i.e., sizeof (unsigned char)). Here, the size of each element in the array may be reduced from a type "long integer" to a type "unsigned character" (typically one byte).

As previously described, the size of each of the compressed elements 312 in the compressed array 306 should be selected such that use of the overflow region 310 (also referred to as an overflow rate) is limited. In some cases, however, the overflow rate may significantly and unexpectedly increase. For example, the overflow rate may increase when data in a program changes or code in a program is reused from another program. The processor may incur overhead when using the overflow region 310 because a write to the overflow region 310 also involves a write of the overflow index 242 in the compressed region 308. In order to reduce this overhead, the processor may be configured to implement heuristics that monitor the overflow rate. If the frequency of the overflow rate increases such that the overhead caused use of the overflow region 310 exceeds any benefit from the compressed array 306, then the heuristics may instruct the processor to revert the compressed array 306 back to the original array 302. The processor may be configured to revert the compressed array 306 back to the original array 302 by invoking a software routine via a processor interrupt. The software routine may instruct the processor to retrieve data items from the compressed array 306, shift and align the data items as necessary, and store the data items in their original locations in the original array 302. The software routine may further instruct the processor to clear the compressed array table 224.

Figure 4:
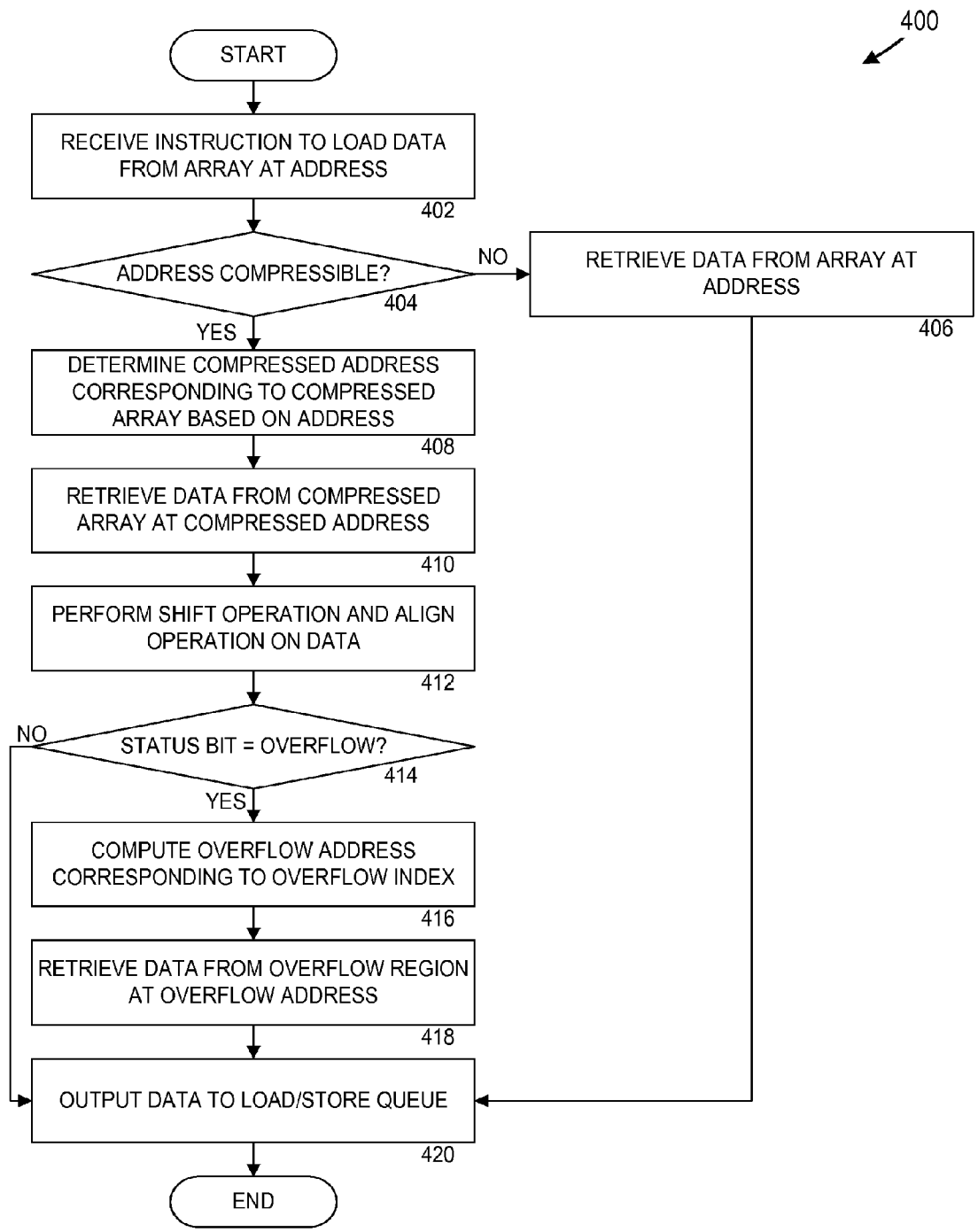
FIG. 4 is a flow diagram illustrating an example process adapted to perform a load instruction on a compressed array.

FIG. 4 is a flow diagram illustrating an example process 400 adapted to perform a load instruction on a compressed array, arranged in accordance with at least some embodiments presented herein. The process 400 may include various operation, functions, or actions as illustrated by one or more blocks 402 through 414.

The process 400 may begin at block 402 (Receive Instruction to Load Data from Array at Address), where a processor may be configured to receive a load instruction. The load instruction may instruct the processor to load data from an array at a particular memory address. In some embodiments, the processor may be configured to fetch an instruction from an instruction sequence. The processor may then be configured to decode the instruction to identify that the instruction is a load instruction and to identify the memory address to be accessed. Block 402 may be followed by block 404.

At block 404 (Address Compressible?), the processor may be configured to determine whether the memory address associated with the load instruction is compressible. In some embodiments, a memory address may be compressible if the memory address falls within a specific address range. This specific address range may correspond to the memory addresses occupied by an original array that is compressed into a compressed array. An example of an original array is the original array 302, and an example of a compressed array is the compressed array 306. If the processor determines that the memory address is compressible, then block 404 may be followed by block 408. If the processor determines that the memory address is not compressible, then block 404 may be followed by block 406.

At block 406 (Retrieve Data From Array at Address), the processor may be configured to retrieve data from the original array at the memory address. Because the memory address is not compressible, the data can be retrieved from the original array. The memory address may correspond to an element of the original array. The processor may be configured to retrieve the data from the element. Block 406 may be followed by block 420.

At block 408 (Determine Compressed Address Corresponding to Compressed Array Based on Address), the processor may be configured to determine a compressed memory address corresponding to the memory address associated with the load instruction. The memory address may refer to a particular element in the original array. The compressed memory address may refer to the same element in the compressed array. In some embodiments, the processor may be configured to determine the compressed memory address based on information retrieved from a compressed array table, such as the compressed array table 120. For example, the compressed array table may provide an original size of each element in the original array, a new size of each compressed element in the compressed array, and a base address of the original array. Block 408 may be followed by block 410.

At block 410 (Retrieve Data from Compressed Array at Compressed Address), the processor may be configured to retrieve data from the compressed array at the compressed memory address. The compressed memory address may refer to a particular compressed element in the compressed array. Thus, the processor may be configured to retrieve data from the compressed element corresponding to the compressed memory address. Block 410 may be followed by block 412.

At block 412 (Perform Shift Operation and Align Operation on Data), the processor may be configured perform a shift operation and an align operation in order to place the data in its original format before it was stored in a compressed element. When the processor retrieves the data from the compressed array, the data may be misaligned, contain unneeded bits, and/or require padding bits. The processor may be configured to perform a shift operation to remove the unneeded bits from the data and perform an align operation to recover an original alignment of the data before it was stored in the compressed array. Block 412 may be followed by block 414.

At block 414 (Status Bit Indicates Overflow?), the processor may be configured to determine whether a status bit, such as the status bits 314, corresponding to the compressed address indicates an overflow. For example, a binary "0" value in the status bit may indicate no overflow, and a binary "1" value in the status bit may indicate an overflow. If the status bit indicates no overflow, then the data retrieved from the compressed element in block 4048 is the requested data, and block 412 may be followed by block 420. If the status bit indicates an overflow, then the data retrieved from the compressed element in block 410 is an overflow index, and block 414 may be followed by block 416.

At block 416 (Compute Overflow Address Corresponding to Overflow Index), the processor may be configured to compute an overflow memory address, such as the overflow memory address 248, corresponding to the overflow index. The overflow memory address may refer to a memory address in an overflow region of the compressed array of an overflow element containing the requested data. Block 416 may be followed by block 418.

At block 418 (Retrieve Data from Overflow Region at Overflow Address), the processor may be configured to retrieve data from the compressed array at the overflow memory address. The overflow memory address may refer to a particular overflow element in the overflow region of the compressed array. Thus, the processor may be configured to retrieve data from the overflow element corresponding to the overflow memory address. Block 418 may be followed by block 420.

At block 420 (Output Data to Load/Store Queue), the processor may be configured to output the data received block 406, block 414, or block 418 to a load/store queue, such as the load/store queue 108. The load/store queue may be configured to return the data to the processor. After block 420, the process 400 may either repeat (e.g., periodically, continuously, or on demand as needed) or terminate.

Figure 5:
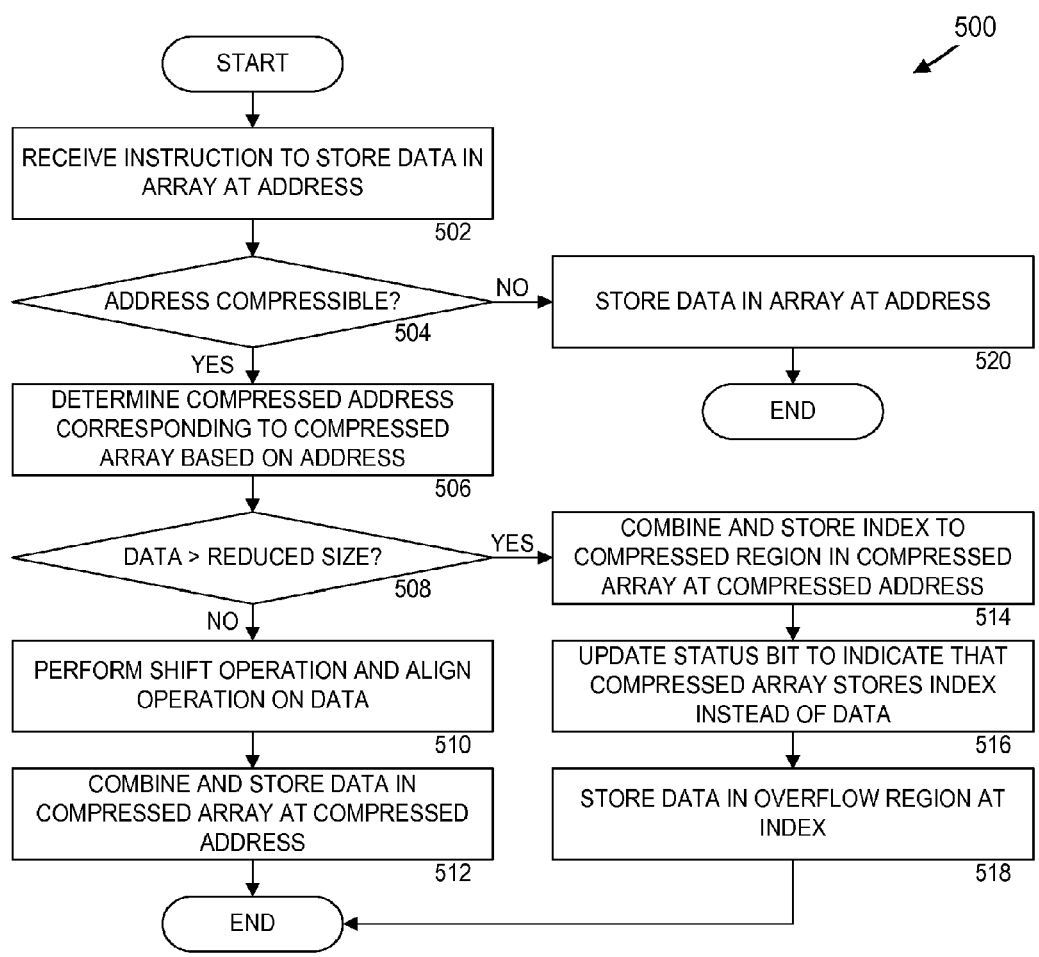
FIG. 5 is a flow diagram illustrating an example process 500 adapted to perform a store instruction on a compressed array.

FIG. 5 is a flow diagram illustrating an example process 500 adapted to perform a store instruction on a compressed array, arranged in accordance with at least some embodiments presented herein. The process 50) may include various operations, functions, or actions as illustrated by one or more blocks 502 through 520.

The process 500 may begin at block 502 (Receive Instruction to Store Data in Array at Address), where a processor maybe configured to receive a store instruction. The store instruction may instruct the processor to store data in an array at a particular memory address. In some embodiments, the processor may be configured to fetch an instruction from an instruction sequence. The processor may then be configured to decode the instruction to identify that the instruction is a store instruction, to identify the data to be stored, and to identify the memory address to be accessed. Block 502 may be followed by block 504.

At block 504 (Address Compressible?), the processor may be configured to determine whether the memory address associated with the store instruction is compressible. In some embodiments, a memory address may be compressible if the memory address falls within a specific address range. This specific address range may correspond to the memory addresses occupied by an original array that is compressed into a compressed array. An example of an original array is the original array 302, and an example of a compressed array is the compressed array 306. If the processor determines that the memory address is compressible, then block 504 may be followed by block 506. If the processor determines that the memory address is not compressible, then block 504 may be followed by block 520.

At block 506 (Determine Compressed Address Corresponding to Compressed Array Based on Address), the processor may be configured to determine a compressed memory address corresponding to the memory address associated with the load instruction. The memory address may refer to a particular element in the original array. The compressed memory address may refer to the same element in the compressed array. In some embodiments, the processor may be configured to determine the compressed memory address based on information retrieved from a compressed array table, such as the compressed array table 224. For example, the compressed array table may provide an original size of each element in the original array, a new size of each compressed element in the compressed array, and a base address of the original array. Block 506 may be followed by block 508.

At block 508 (Data Greater Than Reduced Size?), the processor may be configured to determine whether the size of the data is larger than the size of each compressed element in the compressed array. If the data is not larger than the size of each compressed element in the compressed array, then block 508 may be followed by block 510. If the data is larger than the size of each compressed element in the compressed array, then block 508 may be followed by block 514.

At block 510 (Perform Shift Operation and Align Operation on Data), the processor may be configured to perform a shift operation and an align operation in order to place the data in a suitable format compatible for storage in a compressed element. When the processor receives the data, the data may be misaligned, contain unneeded bits, and/or require padding bits. The processor may be configured to perform a shift operation to remove the unneeded bits from the data and perform an align operation to align the data for storage in a compressed element. Block 510 may be followed by block 512.

At block 512 (Combine and Store Data in Compressed Array at Compressed Address), the processor may be configured to combine the shifted and aligned data with data in memory. The compressed memory address may refer to a particular compressed element in the compressed array. During the combine process, the processor may be configured to read data from the compressed element corresponding to the compressed memory address. The processor may then be configured to combine the shifted and aligned data with the data from the compressed element. The processor may be configured to store the combined data in the compressed element corresponding to the compressed memory address. After block 512, the process 500 may either repeat (e.g., periodically, continuously, or on demand as needed) or terminate.

At block 514 (Combine and Store Index to Compressed Region in Compressed Array at Compressed Address), the processor may be configured to store an index to the overflow region in the compressed array at the compressed memory address. The compressed array may include a compressed region and an overflow region, such as the compressed region 308 and the overflow region 310. The overflow region may include multiple overflow elements, such as the overflow elements 316. The index may be the overflow index 242, which may refer to the next free overflow element in the overflow region. The compressed memory address may refer to a particular compressed element in the compressed region. The processor may be configured to retrieve the overflow index 242 from the compressed array table 224. The processor may also be configured to read data from the compressed element corresponding to the compressed memory address and combine the overflow index 242 with the data from the compressed element. The processor may then be configured to store the combined index containing the overflow index 242 in the compressed element corresponding to the compressed memory address. The processor may further be configured to increment the overflow index 242 in the compressed array table 224 to reference the next free overflow element in the overflow region. Block 514 may be followed by block 516.

At block 516 (Update Status Bit to Indicate That Compressed Array Stores Index Instead of Data), the processor may be configured to update a status bit, such as the status bits 314, to indicate that the compressed array stores the index to the overflow region instead of the actual data. Each compressed element in the compressed array may be augmented with a corresponding status bit. For a given compressed element, the corresponding status bit may indicate whether content stored in the compressed element is an index to the overflow region or actual data (i.e., data that is not an index to the overflow region). In this way, when the processor is instructed to retrieve data from a compressed element, the processor can read the corresponding status bit in order to determine whether the data is contained in the compressed element or in the overflow region. In some embodiments, the processor may be configured to update the status bit from a first bit value indicating that the corresponding compressed element stores the data to a second bit value indicating that corresponding compressed element stores the index to the overflow region. Block 516 may be followed by block 518.

At block 518 (Store Data in Overflow Region at Index), the processor may be configured to store the data in the overflow region at the index. The compressed array may include a compressed region and an overflow region, such as the compressed region 308 and the overflow region 310. The overflow region may include multiple overflow elements, such as the overflow elements 316. The index may be the overflow index 242, which may refer to the next free overflow element in the compressed region. The processor may be configured to store the data in the overflow element corresponding to the index. In some embodiments, the processor may be configured to compute an overflow memory address based on the index. The overflow element may correspond to the overflow memory address. After block 518, the process 500 may either repeat (e.g., periodically, continuously, or on demand as needed) or terminate.

At block 520 (Store Data in Array At Address), the processor may be configured to store the data in the array at the memory address. The array may be an original array, such as the original array 302. The array may include multiple elements, such as the elements 304. The processor may be configured to store the data in the element corresponding to the memory address. After block 520, the process 500 may either repeat (e.g., periodically, continuously, or on demand as needed) or terminate.

Figure 6:
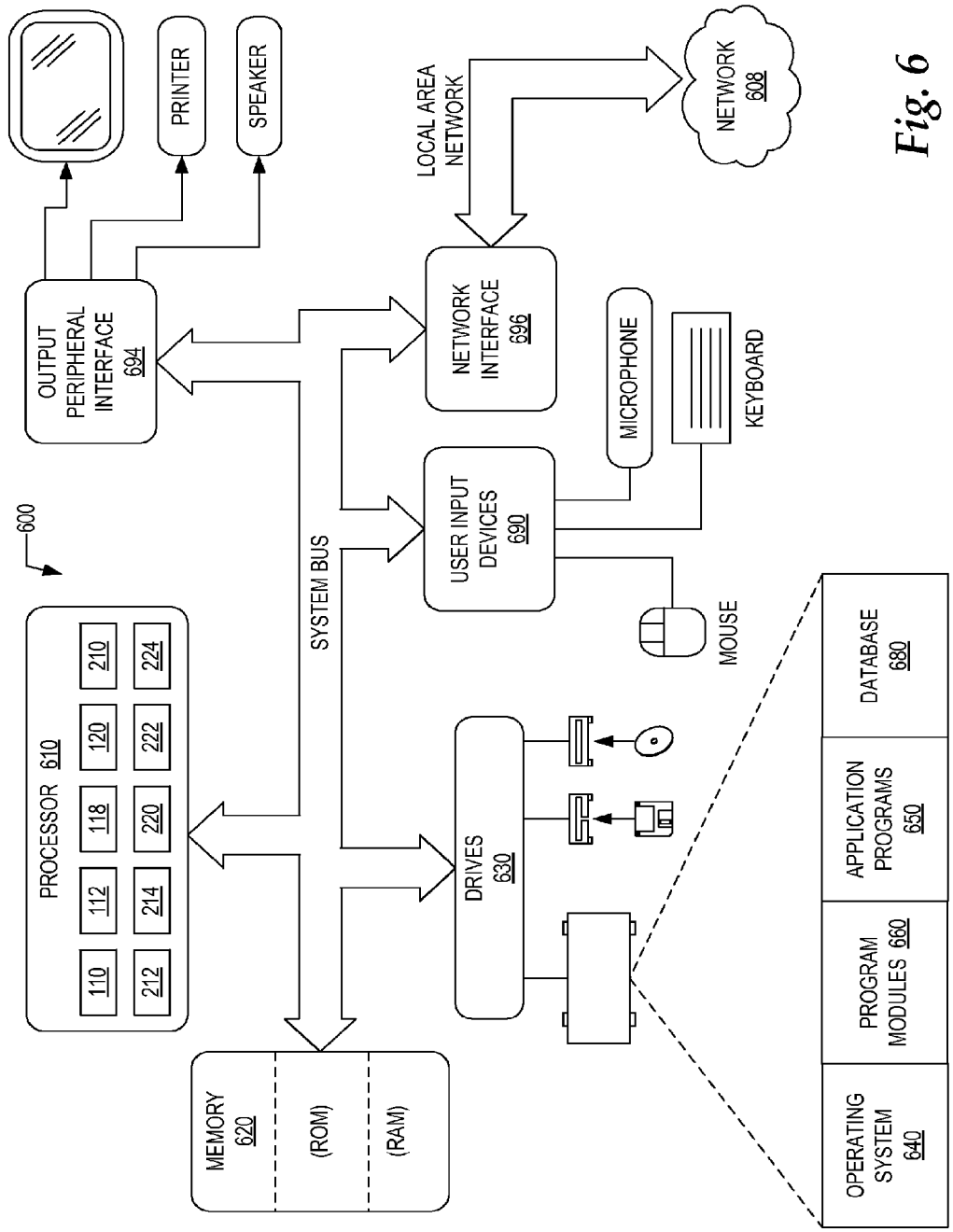
FIG. 6 is a block diagram illustrating a computer hardware architecture for an example computing system.

FIG. 6 is a block diagram illustrating a computer hardware architecture for an example computing system, arranged in accordance with at least some embodiments presented herein. FIG. 6 includes a computer 600, including a processor 610, memory 620, and one or more drives 630. The computer 600 may be implemented as a conventional computer system, an embedded control computer, a laptop, or a server computer, a mobile device, a set-top box, a kiosk, a vehicular information system, a mobile telephone, a customized machine, or other hardware platform. The processor 610 may be configured to implement the various logic described in FIGS. 1 and 2, including the address check module 110, the address recompute module 112, the shift and align module 118, the compressed array table 120, the address check module 210, the first address recompute module 212, the second address recompute module 214, the shift and align module 220, the overflow detect module 222, and/or the compressed array table 224.

The drives 630 and their associated computer storage media, provide storage of computer readable instructions, data structures, program modules and other data for the computer 600. The drives 630 can include an operating system 640, application programs 650, program modules 660, and a database 680. The computer 600 further includes user input devices 690 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 610 through a user input interface that is coupled to a system bus, but may be coupled by other interface and bus structures, such as a parallel port, game port or a universal serial bus ("USB"). Computers such as the computer 600 may also include other peripheral output devices such as speakers, which may be coupled through an output peripheral interface 694 or the like.

The computer 600 may operate in a networked environment using logical connections to one or more computers, such as a remote computer coupled to a network interface 696. The remote computer may be a personal computer, a server, a router, a network PC, a peer device or other common network node, and can include many or all of the elements described above relative to the computer 600. Networking environments are commonplace in offices, enterprise-wide area networks ("WAN"), local area networks ("LAN"), intranets, and the Internet.

When used in a LAN or WLAN networking environment, the computer 600 may be coupled to the LAN through the network interface 696 or an adapter. When used in a WAN networking environment, the computer 600 typically includes a modem or other means for establishing communications over the WAN, such as the Internet or the network 608. The WAN may include the Internet, the illustrated network 608, various other networks, or any combination thereof. It will be appreciated that other mechanisms of establishing a communications link, ring, mesh, bus, cloud, or network between the computers may be used.

According to some embodiments, the computer 600 may be coupled to a networking environment. The computer 600 may include one or more instances of a physical computer-readable storage medium or media associated with the drives 630 or other storage devices. The system bus may enable the processor 610 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 620, whether characterized as RAM, ROM, flash, or other types of volatile or nonvolatile memory technology. The media may also represent secondary storage, whether implemented as the storage drives 630 or otherwise. Hard drive implementations may be characterized as solid state, or may include rotating media storing magnetically-encoded information.

The storage media may include one or more program modules 660. The program modules 660 may include software instructions that, when loaded into the processor 610 and executed, transform a general-purpose computing system into a special-purpose computing system. As detailed throughout this description, the program modules 660 may provide various tools or techniques by which the computer 600 may participate within the overall systems or operating environments using the components, logic flows, and/or data structures discussed herein.

The processor 610 may be constructed from any number of transistors or other circuit elements, which may individually or collectively assume any number of states. More specifically, the processor 610 may operate as a state machine or finite-state machine. Such a machine may be transformed to a second machine, or specific machine by loading executable instructions contained within the program modules 660. These computer-executable instructions may transform the processor 610 by specifying how the processor 610 transitions between states, thereby transforming the transistors or other circuit elements constituting the processor 610 from a first machine to a second machine. The states of either machine may also be transformed by receiving input from the one or more user input devices 690, the network interface 696, other peripherals, other interfaces, or one or more users or other actors. Either machine may also transform states, or various physical characteristics of various output devices such as printers, speakers, video displays, or otherwise.

Encoding the program modules 660 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 660 may transform the physical state of the semiconductor memory 620 when the software is encoded therein. For example, the software may transform the state of transistors, capacitors, or other discrete circuit elements constituting the semiconductor memory 620.

As another example, the storage media may be implemented using magnetic or optical technology such as drives 630. In such implementations, the program modules 660 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 7:
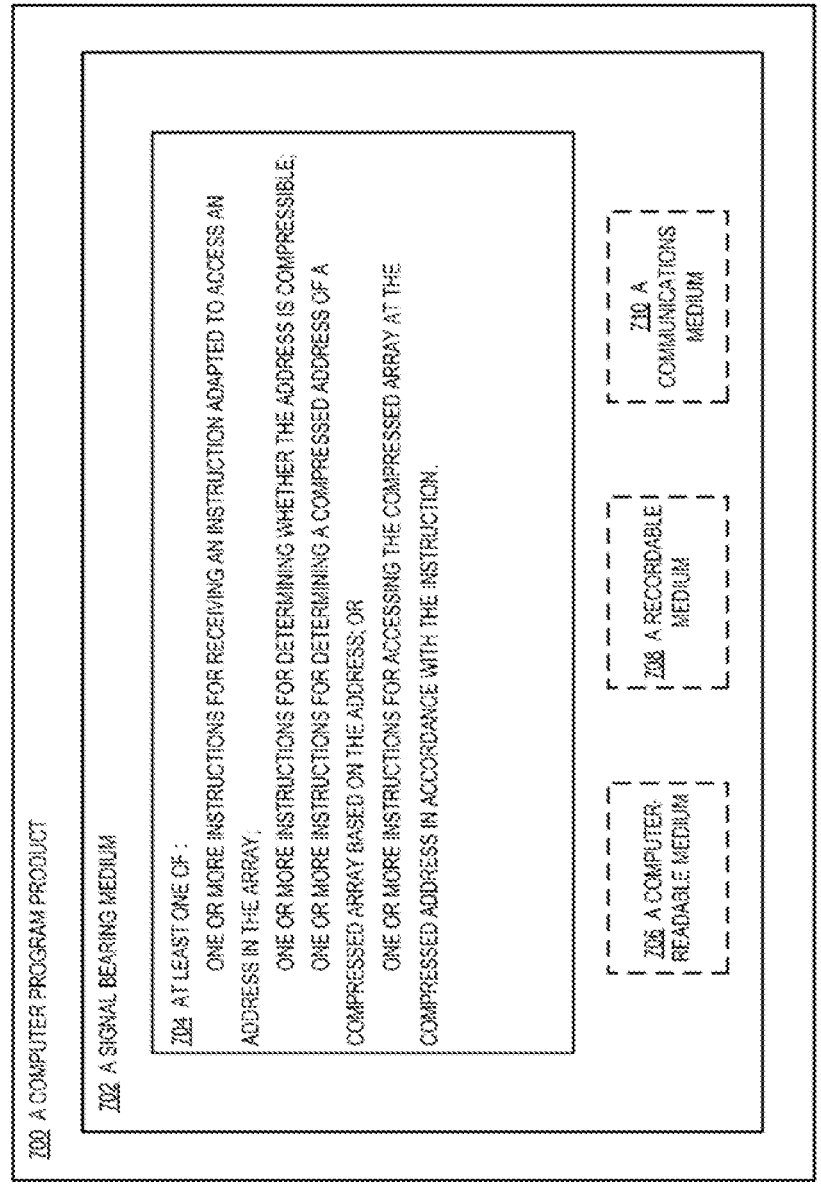
FIG. 7 is a schematic diagram illustrating a computer program product that includes a computer program for executing a computer process on a computing device.

FIG. 7 is a schematic diagram that illustrates a computer program product 700 that includes a computer program for executing a computer process on a computing device, arranged in accordance with at least some embodiments presented herein. An illustrative embodiment of the example computer program product is provided using a signal bearing medium 702, and may include at least one instruction of 704: one or more instructions for receiving an instruction adapted to access an address in the array; one or more instructions for determining whether the address is compressible; one or more instructions for determining a compressed address of a compressed array based on the address; or one or more instructions for accessing the compressed array at the compressed address in accordance with the instruction. In some embodiments, the signal bearing medium 702 of the one or more computer program products 700 include a computer readable medium 706, a recordable medium 708, and/or a communications medium 710.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computing system to reduce energy consumption of the computing system, the computing system comprising:
    a memory unit t instructions; and
    one or more processors coupled to the memory unit, wherein the one or more processors execute the instructions to perform or control performance of operations comprising:
        retrieve an instruction from an instruction sequence, wherein the instruction includes an access to an array at a first memory address;
        decode the instruction to determine the first memory address;
        determine the first memory address as compressible, in response to a determination that the first memory address falls within a range of compressible memory addresses, wherein the range of compressible memory addresses is associated with a memory address range occupied by the array;
        determine a first compressed memory address of a compressed array based on the first memory address, wherein the compressed array represents a compressed layout of the array, and wherein a first bit size of compressed elements in the compressed array is smaller than a first bit size of elements in the array;
        receive a second instruction to store data in the array at a second memory address;
        determine the second memory address as compressible;
        determine a second compressed memory address of the compressed array based on the second memory address;
        determine an overflow region and a compressed region of the compressed array:
        combine an index of the overflow region with data from the compressed array at the second compressed memory address to form a combined index;
        store the combined index in the compressed array at the second compressed memory address; and
        access the compressed array at the first compressed memory address based on the instruction to reduce the energy consumption of the computing system.

2. The computing system of claim 1, wherein the one or more processors further execute the instructions to perform or control performance of at least one operation comprising:
    update a status bit in the compressed array to indicate that the compressed array stores the index of the overflow region within the combined index in the compressed array at the second compressed memory address.

3. The computing system of claim 1, wherein the one or more processors further execute the instructions to perform or control performance of at least one operation comprising:
    store information regarding the compressed array in a compressed array table of the memory unit, wherein the compressed array table includes the first bit size of the elements in the array and the first bit size of the compressed elements in the compressed array.

4. The computing system of claim 1, wherein the one or more processors further execute the instructions to perform or control performance of at least one operation comprising:
    receive inputs of a function in a programming interface of the computing system from a user to generate the compressed array, wherein the inputs of the function include one or more of the first memory address of the array, a number of the elements in the array, the first bit size of the elements in the array, and a suggested bit size of the compressed elements in the compressed array;
    determine the first compressed memory address of the compressed array based on the received inputs; and
    store the compressed array in a compressed array table of the memory unit.

5. The computing system of claim 1, wherein the one or more processors further execute the instructions to perform or control performance of at least one operation comprising:
    store a base memory address of the array in a compressed array table of the memory unit, wherein the base memory address of the array includes the first memory address of a first element in the array.

6. The computing system of claim 1, wherein the one or more processors further execute the instructions to perform or control performance of at least one operation comprising:
    store information regarding one or more of a range of the array and a second bit size of the compressed elements in a compressed array table of the memory unit, wherein the range of the array includes a number of memory addresses in the array.

7. The computing system of claim 1, wherein the one or more processors further execute the instructions to perform or control performance of at least one operation comprising:
    determine the array as corresponding to the first memory address and the second memory address;
    compress the array;
    replace a portion of memory in the memory unit allocated for the array with the compressed array; and store information regarding the compressed array in a compressed array table of the memory unit.

8. The computing system of claim 1, wherein the one or more processors further execute the instructions to perform or control performance of at least one operation comprising:
receive a request to compress one or more of the first memory address and the second memory address; and
deny the request to compress one or more of the first memory address and the second memory address in response to a determination that one or more of the first memory address and the second memory address are outside the memory address range of the array.

9. A method executed in a computing device comprising at least one processor to reduce energy consumption of the computing device, the method comprising:
retrieving, by the least one processor, a first instruction from an instruction sequence, wherein the first instruction includes an access to an array at a first memory address;
decoding, by the at least one processor, the first instruction to determine the first memory address;
determining, by the at least one processor, the first memory address as compressible;
determining, by the at least one processor, a first compressed memory address of a compressed array based on the first memory address, wherein the compressed array represents a compressed layout of the array, and wherein a first bit size of compressed elements in the compressed array is smaller than a first bit size of elements in the array;
receiving, by the at least one processor, a second instruction to store data in the array at a second memory address;
determining, by the at least one processor, the second memory address as compressible;
determining, by the at least one processor, a second compressed memory address of the compressed array based on the second memory address;
determining, by the at least one processor, an overflow region and a compressed region of the compressed array;
combining, by the at least one processor, an index of the overflow region with data from the compressed array at the second compressed memory address to form a combined index;
storing, by the at least one processor, the combined index in the compressed array at the second compressed memory address; and
accessing, by the at least one processor, the compressed array at the first compressed memory address or at the second compressed memory address based on the first instruction or the second instruction to reduce the energy consumption of the computing device.

10. The method of claim 9, further comprising:
storing the compressed elements in a compressed region of the array, wherein the first bit size of the compressed elements is smaller than the first bit size of the elements in the array.

11. The method of claim 9, further comprising:
storing overflow elements in the overflow region of the array, wherein a first bit size of the overflow elements is equivalent to the first bit size of the elements in the array.

12. The method of claim 9, further comprising:
determining a first bit size of a data item, wherein the first bit size of the data item is larger than the first bit size of the compressed elements in the compressed array; and
storing the data item in the overflow region of the array.

13. The method of claim 9, further comprising:
storing information regarding the compressed array in a compressed array table in the computing device,
wherein the compressed array table includes an overflow index of the compressed array, and
wherein the overflow index refers to a subsequent unoccupied overflow element in the overflow region of the compressed array.

14. The method of claim 9, further comprising:
performing a shift operation on data of the array, wherein the shift operation removes repetitive bits from the data.

15. The method of claim 9, further comprising:
performing an align operation on data of the array, wherein the align operation matches a second alignment of the data to a first alignment of the data before compression of the array.

16. A non-transitory computer-readable medium that includes instructions to reduce energy consumption of a computing device, wherein the instructions, in response to execution by one or more processors associated with the computing device, cause the one or more processors to perform or control performance of operations comprising:
retrieving a first instruction from an instruction sequence, wherein the first instruction includes an access to an array at a first memory address;
decoding the first instruction to determine the first memory address;
determining the first memory address as compressible;
determining a first compressed memory address of a compressed array based on the first memory address, wherein the compressed array represents a compressed layout of the array, and wherein a first bit size of compressed elements in the compressed array is smaller than a first bit size of elements in the array;
receiving a second instruction to store data in the array at a second memory address;
determining the second memory address as compressible;
determining a second compressed memory address of the compressed array based on the second memory address;
determining an overflow region and a compressed region of the compressed array;
combining, by the at least one or more processors, an index of the overflow region with data from the compressed array at the second compressed memory address to form a combined index;
storing the combined index in the compressed array at the second compressed memory address; and
accessing the compressed array at the first compressed memory address or at the second compressed memory address based on the first instruction or the second instruction to reduce the energy consumption of the computing device.

17. The computer-readable memory device of claim 16, wherein the instructions further comprise instructions that, in response to execution by the one or more processors, cause the one or more processors to perform at least one operation comprising:
updating a status bit in the compressed array to indicate that the compressed array stores the index of the overflow region within the combined index in the compressed array at the second compressed memory address.

\* \* \* \* \*

UNITED STATES PATENT AND TRADEMARK OFFICE
CERTIFICATE OF CORRECTION

PATENT NO. : 10,007,605 B2
APPLICATION NO. : 14/859322
DATED : June 26, 2018
INVENTOR(S) : Solihin It is certified that error appears in the above-identified patent and that said Letters Patent is hereby corrected as shown below:

In the Claims

In Column 25, Line 44, please delete "unit t instructions;" and insert -- unit stores instructions -- therefor.

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*